(12) United States Patent
Atkins

(10) Patent No.: US 12,401,776 B2
(45) Date of Patent: Aug. 26, 2025

(54) SYSTEMS AND METHODS FOR PROCESSING VOLUMETRIC IMAGES

(71) Applicant: Dolby Laboratories Licensing Corporation, San Francisco, CA (US)

(72) Inventor: Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 121 days.

(21) Appl. No.: 18/549,571

(22) PCT Filed: May 5, 2022

(86) PCT No.: PCT/US2022/027918
§ 371 (c)(1),
(2) Date: Sep. 7, 2023

(87) PCT Pub. No.: WO2022/235969
PCT Pub. Date: Nov. 10, 2022

(65) Prior Publication Data
US 2024/0155095 A1    May 9, 2024

Related U.S. Application Data

(60) Provisional application No. 63/185,082, filed on May 6, 2021.

(30) Foreign Application Priority Data

May 6, 2021    (EP) ..................................... 21172493

(51) Int. Cl.
*G01S 19/26*    (2010.01)
*H04N 13/128*    (2018.01)
(Continued)

(52) U.S. Cl.
CPC ......... *H04N 13/178* (2018.05); *H04N 13/128* (2018.05); *H04N 13/221* (2018.05); *H04N 23/74* (2023.01)

(58) Field of Classification Search
CPC .. H04N 13/178; H04N 13/128; H04N 13/221; H04N 23/74; H04N 13/261
See application file for complete search history.

(56) References Cited

U.S. PATENT DOCUMENTS 8,723,919 B2    5/2014    Seong
8,750,599 B2    6/2014    Godar
(Continued)

FOREIGN PATENT DOCUMENTS

CN    104902256 B    1/2018
JP    3693407 B2    9/2005
(Continued)

OTHER PUBLICATIONS

M. Uyttendaele et al., "Eliminating ghosting and exposure artifacts in image mosaics," Proceedings of the 2001 IEEE Computer Society Conference on Computer Vision and Pattern Recognition. CVPR 2001. vol. 2. IEEE, 2001.

*Primary Examiner* — Howard D Brown, Jr.

(57)    ABSTRACT

A volumetric image of a scene can be created, in one embodiment, by recording, through a camera in a device, a series of images of the scene as the camera is moved along a path relative to the scene; during the recording, the device stores motion path metadata about the path, and the series of images is associated with the motion path metadata and a metadata label is associated with the series of images, the metadata label indicating that the recorded series of images represent a volumetric image of the scene. The series of images, the motion path metadata and the metadata label can be assembled into a package for distribution to devices that can view the volumetric image, which may be referred to as (Continued)

a limited volumetric image. The devices that receive the volumetric image can display the individual images in the series of images or as a video.

19 Claims, 9 Drawing Sheets

(51) Int. Cl.
*H04N 13/178* (2018.01)
*H04N 13/221* (2018.01)
*H04N 23/74* (2023.01)

(56) References Cited

U.S. PATENT DOCUMENTS

| | | | |
|---|---|---|---|
| 9,167,227 | B2 | 10/2015 | Nagasawa |
| 10,877,210 | B2 | 12/2020 | Karafin |
| 11,792,532 | B2 | 10/2023 | Atkins |
| 2011/0135005 | A1 | 6/2011 | Tourapis |
| 2016/0065948 | A1 | 3/2016 | Mcnamer |
| 2017/0061687 | A1* | 3/2017 | Hong ................. G06F 3/04845 |
| 2018/0213186 | A1 | 7/2018 | Chandra |
| 2018/0335524 | A1* | 11/2018 | Youssef ................. G01S 19/22 |
| 2019/0014307 | A1 | 1/2019 | Mcnamer |

FOREIGN PATENT DOCUMENTS

| | | |
|---|---|---|
| KR | 19980028347 A | 7/1998 |
| WO | 20110014420 A1 | 2/2011 |
| WO | 2012058442 A1 | 5/2012 |
| WO | 2012092246 A2 | 7/2012 |
| WO | 2020264409 A1 | 12/2020 |
| WO | 2022120104 A2 | 6/2022 |

\* cited by examiner

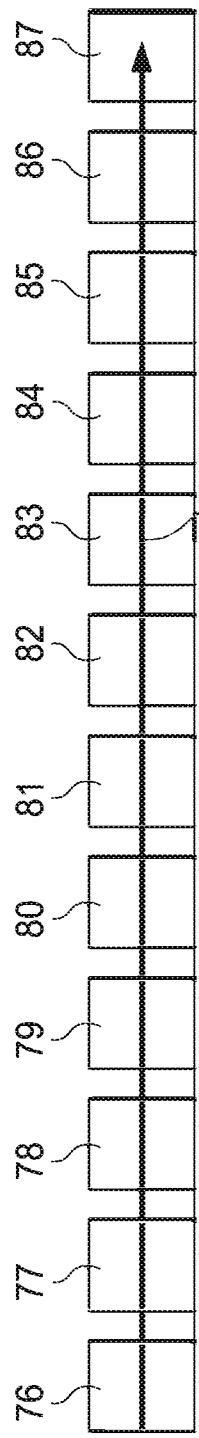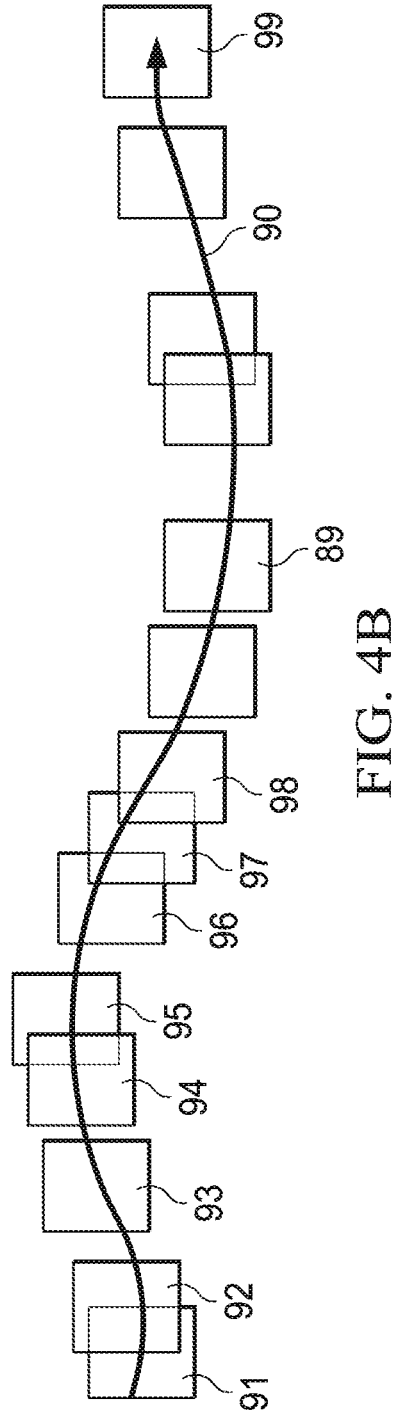

SYSTEMS AND METHODS FOR PROCESSING VOLUMETRIC IMAGES

CROSS-REFERENCE TO RELATED APPLICATIONS

This application is a U.S. National Stage application under U.S.C. 371 of International Application No. PCT/US2022/027918, filed on May 5, 2022, which claims the benefit of priority to U.S. Provisional Patent Application No. 63/185,082, filed May 6, 2021, and European Patent Application No. 21172493.5, filed May 6, 2021, each of which is hereby incorporated by reference in its entirety.

BACKGROUND

This disclosure relates to methods and systems for recording and displaying images. In particular, this disclosure relates to methods and systems for recording and displaying volumetric images.

Conventional photographs capture a 2D (two dimensions) projection of a scene as observed from a single viewpoint, the location of the aperture of a camera when the photograph was taken. Conventional graphics, drawings, and computer-generated renderings also have only a single viewpoint.

However, in real life the human visual system is exposed to very rich depth cues that arise from viewing a scene from different perspectives. This visual system is able to compare how a scene appears from different viewpoints to infer the 3D (three dimensions) geometry of the world around the observer.

This difference between how the real world is perceived and how it is captured today using conventional photographic techniques places a distinct limitation on how well the impression of a scene can be captured, shared, and viewed by others. Without the depth information that is obtained from viewing from multiple viewpoints, the true feeling or understanding of the scene is lost, and cannot be recovered.

Some efforts have been made to address this gap. 3D binocular imaging captures a scene from two viewpoints corresponding to the location of two eyes. This can greatly add a sense of depth and realism. However, it is limited since the image is still the same as an observer moves around. This discrepancy between how the image "should" appear and how it "does" appear limits how well the true representation of the scene can be reproduced.

More recent efforts involve volumetric or light field capture that create a volumetric image. These involve arrays of many cameras that capture a scene from many viewpoints simultaneously. This then allows for the "true scene" to be reproduced correctly from a wide range of viewpoints. The downside to this approach is that in many situations it is prohibitive to install the array of cameras required to capture the scene. It also requires careful calibration of the camera array to align the cameras, calibrate the color sensitivities and lenses, and synchronize the capture time. Furthermore, the amount of data created with this process requires complex image processing and compression in order to transmit, in addition to complex rendering at playback.

A simple and user friendly method of capturing a volumetric representation of a scene (such as a volumetric image) is desirable but not provided by techniques known in the art.

SUMMARY OF THE DESCRIPTION

A volumetric image of a scene can be created; in one embodiment, by recording, through a camera in a device, a series of images of the scene as the camera is moved along a path relative to the scene; during the recording; the device can store motion path metadata about the path, and the series of images is associated with the motion path metadata and a metadata label is associated with the series of images; the metadata label indicating that the recorded series of images represent a volumetric image of the scene. The series of images, the motion path metadata and the metadata label can be assembled into a package for distribution to devices that can view the volumetric image, which may be referred to as a limited volumetric image that has a set of images of the scene from different camera positions as a result of the movement of the camera during the recording. The devices that receive the volumetric image can display the individual images in the series of images at desired viewpoints (or playback the recording as a video). This volumetric image may be referred to as a limited volumetric image. In one embodiment, the recording can be through a camera set in a video capture mode (e.g., movie mode), and the recording includes a continuous capturing and storing of images, over a period of time, and the capturing is performed at a predetermined frame rate used for displaying video (e.g., 30 or 60 frames per second). In another embodiment, the frame rate may not be predetermined, but rather the times that frames are captured are based on the movement of the camera along the path; this can mean that the rate at which images are captured varies as the speed of movement of the camera varies along the motion path.

The images may be associated with the motion path metadata so as to associate and/or link each image to a position (e.g. each respective image to a respective position) along the motion path, such as a position along the motion path at which the image was captured. In an embodiment, the motion path may be captured or recorded with, such as simultaneously with, the images, e.g. by the camera or by a device configured to determine the motion path. In an embodiment, the series of images may be captured by a continuous capturing and storing of images, over a period of time. The capturing may be performed at a predetermined frame rate used for displaying video or at a rate based upon movement of the camera along the path. A volumetric image may comprise a set of images of the scene from different camera positions or viewpoints, and wherein the series of images, the associated first motion path metadata and the metadata label may be assembled into a package. The series of images may be compressed in the package.

In one embodiment, after the series of images is recorded, the series of images can be conformed to a desired motion path and the motion path metadata can be updated based on the conformed series of images. For example, if the desired motion path is a horizontal line, vertical deviations in the actual motion path (as indicated by the motion path metadata) can be corrected or conformed to the desired horizontal line by cropping the images that deviate vertically and interpolating portions of the images that were cropped; this may also mean that certain images are entirely cropped out, resulting in a larger displacement from image to next image, and this larger displacement should be updated in the motion path metadata in one embodiment. In one embodiment, after the series of images is recorded, the positions of one or more images can be adjusted to smooth displacements along the desired motion path from image to image in the series of images. For example, if certain images were eliminated due to vertical cropping, the positions of images near the eliminated images are adjusted to smooth out image to image displacements (e.g., eliminate large jumps between adjacent images) along the motion path. The adjusting of the positions means that the motion path metadata should be updated to account for the adjustments in the positions. In one embodiment, the motion path metadata can indicate actual physical displacements of the camera during the recording (as the camera is moved along a path) from one image to the next image. The motion path metadata can be used at playback time to select for display a desired viewpoint on the scene; for example, if the viewer desires to see the viewpoint at the middle of the path, the motion path metadata is used to find the middle of the path and the closest image that was recorded at that point along the path.

In one embodiment, during the recording, the camera (or device containing the camera such as a smart phone) can display a guide on a display device (e.g. LCD or OLED display); the guide can show the user how to move (e.g., both in direction and speed) the camera or device over a period of time to produce a good recording. Also in one embodiment, the camera or device can store distance metadata that provides an estimate of a distance between one or more objects in the scene and the single camera; this distance metadata can be used when interpolating to a viewpoint. In one embodiment, the camera or device can also store dynamic range metadata that indicates a dynamic range in each image in a set of images in the series of images, where the dynamic range for each image indicates a luminance range for each image (such as a maximum luminance value in the image; the average luminance value in the image, and the minimum luminance value in the image). This dynamic range metadata can be used on a playback device to adjust the luminance values of image data based on the luminance range of a particular image and the luminance capabilities of the display device of the playback device, and this can be done using techniques known in the art for color volume mapping.

A playback device and method for playback of a volumetric image is another aspect of this disclosure. An embodiment of such a method can include the following operations: receiving a series of images with associated motion path metadata and a volumetric metadata label indicating the series of images represent a volumetric image of a scene; determining a desired viewpoint of the volumetric image; determining from the desired viewpoint a selected image based on the series of images; and displaying the selected image. The determination of the selected image can be based on a comparison of the desired viewpoint to the motion path metadata. The motion path metadata can indicate displacement, along a path used during recording of the series of images, from one image to the next image in the series of images. The playback device can receive a package that contains the series of images (in, for example, a compressed format) and the motion path metadata and the volumetric metadata label assembled together in the package. In one embodiment, the recording supports at least two modes of presenting content in the volumetric image at the playback device: (1) display of a single image at the desired viewpoint and (2) display of the series of images as a movie.

In one embodiment of the method and/or playback device, determining the selected image is based upon a comparison of the desired viewpoint to the motion path metadata and wherein the series of images were recorded during a continuous capturing and storing of images in a single camera, over a period of time along a path of motion of the single camera, and the capturing was performed at a predetermined frame rate used for displaying video or at a rate based upon movement of the camera along the path.

In one embodiment, the desired viewpoint can be determined at the playback device from one of (1) a manual user selection from a user interface or (2) sensor based tracking of a user's face or head or (3) a predetermined set of one or more viewpoints provided by a content creator, and the predetermined set can include an ordered sequence of images to be displayed. In one embodiment, the sensor based tracking automatically determines the desired viewpoint from a location, detected by the sensor; of a viewer's head. The sensor can be a camera or set of sensors such as a conventional 2D camera and a time of flight camera or LIDAR (light detection and ranging). In one embodiment, the playback device can adapt the selected image by zooming the selected image or vertically shifting the image through an affine transformation. In one embodiment, playback device can receive dynamic range metadata that indicates a dynamic range in each image in a set of images in the series of images, the dynamic range for each image indicating a luminance range; and mapping the selected image, based on its dynamic range metadata, to a target display's dynamic range capabilities (using known color volume mapping techniques). In one embodiment; the selected image is interpolated by the playback device from a set of images in the series of images, the set of images representing a match between the desired viewpoint and the motion path metadata.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods and such a data processing system can be referred to as an imaging system. The data processing system can be any one of: a smartphone that includes a camera, a tablet computer that includes a camera; a laptop computer with a camera, a conventional camera with added hardware or software to capture the motion path metadata and to perform the other tasks described herein, and other devices.

The above summary does not include an exhaustive list of all embodiments and aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 4A shows an intended motion path for recording a series of images.

FIG. 4B shows an example of an actual motion path taken during a recording of a scene to create a volumetric image; the actual motion path shows deviations outside of the intended motion path shown in FIG. 4A.

DETAILED DESCRIPTION

Figure 2A:
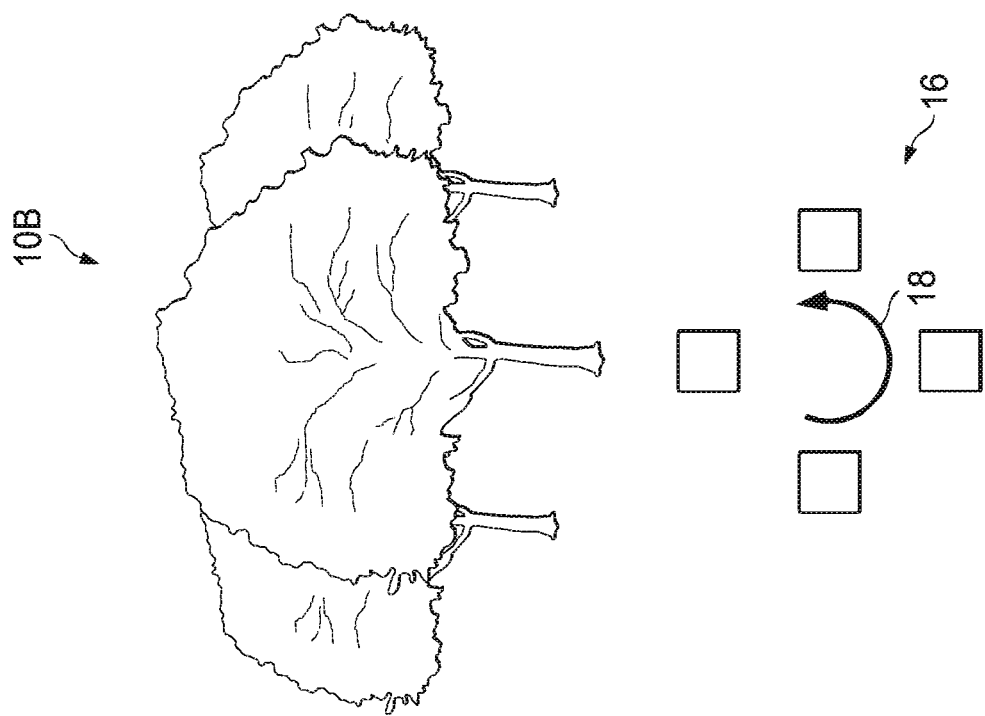
FIG. 2A shows an example of a method of recording a scene by moving a camera in a circular motion across a scene (a set of trees) while recording images of the scene in video mode.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations; it should be appreciated that some of the operations described may be performed in a different order. Moreover, some operations may be performed in parallel rather than sequentially.

Recording of a Volumetric Image

An embodiment can begin with a user moving a camera and recording a video of a scene while moving the camera; the term video is meant to include an image capturing process that is a continuous capturing and storing of images at a predetermined frame rate over a period of time. The predetermined frame rate can be a standard video or movie frame rate such as 30 frames per second (i.e., 30 frames of images are captured and stored every second while recording the scene); as is known in the art, the frame rate can be even higher or lower than 30 frames per second. Higher frame rates will improve the chances of being able to perform some of the interpolations described herein. The period of time (of the recording) can be as short as a few seconds while the camera is moved by the user or as long as a several minutes. The recording device that includes the camera may specify the motion path, and this specified motion path may be selected by the user before beginning the recording process. The motion path can be any one of: a horizontal line path; a vertical path, a circular path, a square path, a random path or a serpentine path. The simplest, horizontal motion path, is described in detail in this disclosure, but the embodiments can be extended to other motion types as well. In another embodiment, the frame rate may not be predetermined but rather the times that frames are captured are based on the movement of the camera along the path; this can mean that the rate at which images are captured varies as the speed of movement of the camera varies along the motion path. For example, the device containing the camera can monitor the movement, along the motion path as described below, and capture a frame or image based upon the movement. When a displacement from the last captured frame's position reaches a desired value (e.g., the camera has moved 1 mm of displacement since the last image was captured) then the camera captures the next frame and this can be repeated as the camera is moved along the motion path. Thus, the camera's movement triggers when frames are captured (e.g., a frame is captured for each 1 mm of displacement along the path) so that the camera's position along the path controls when frames are captured. This can be done to minimize the number of captured frames (but still have enough to provide good coverage of the scene if the frame to frame displacement value is small) and also can simultaneously conform the images to the motion path (at least conforming the spacing of captured images along the path as described below in connection with FIG. 6C). This conforming can be done during capture rather than as a post-processing operation as described below.

The camera may be a digital camera, such as an optical and/or a photographic camera. The camera may be configured to capture light from the visible spectrum, i.e. the spectrum of light visible to the human eye.

Figure 1:
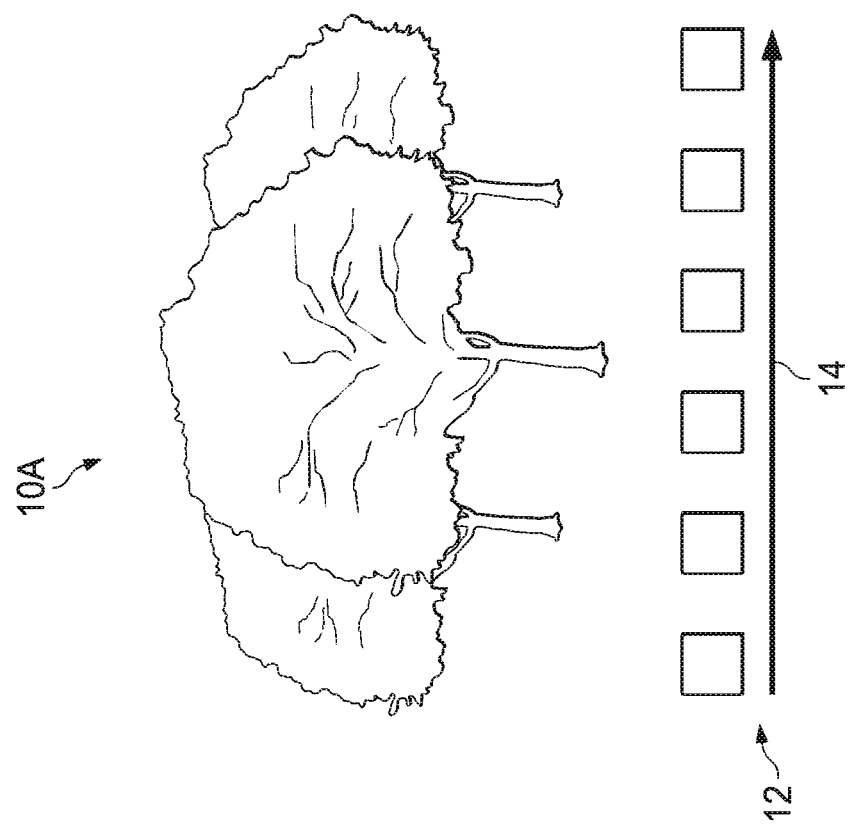
FIG. 1 shows an example of a method of recording a scene by moving a camera horizontally across a scene (a set of trees) while recording images of the scene in video mode.
Figure 2C:
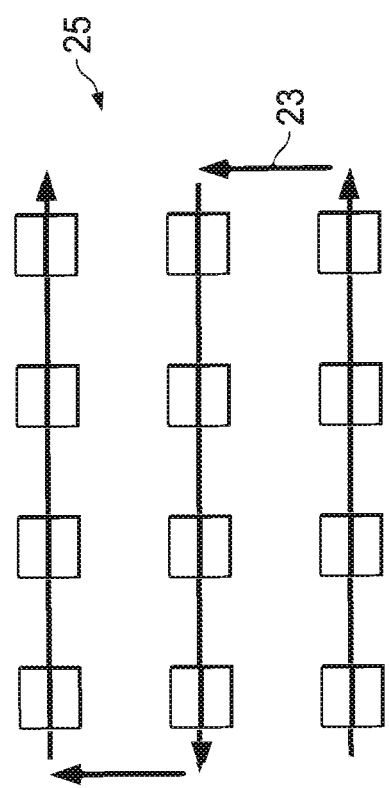
FIG. 2C shows an example of a method of recording a scene by moving a camera in a serpentine path across a scene (a set of trees not shown) while recording images of the scene in video mode.
Figure 2B:
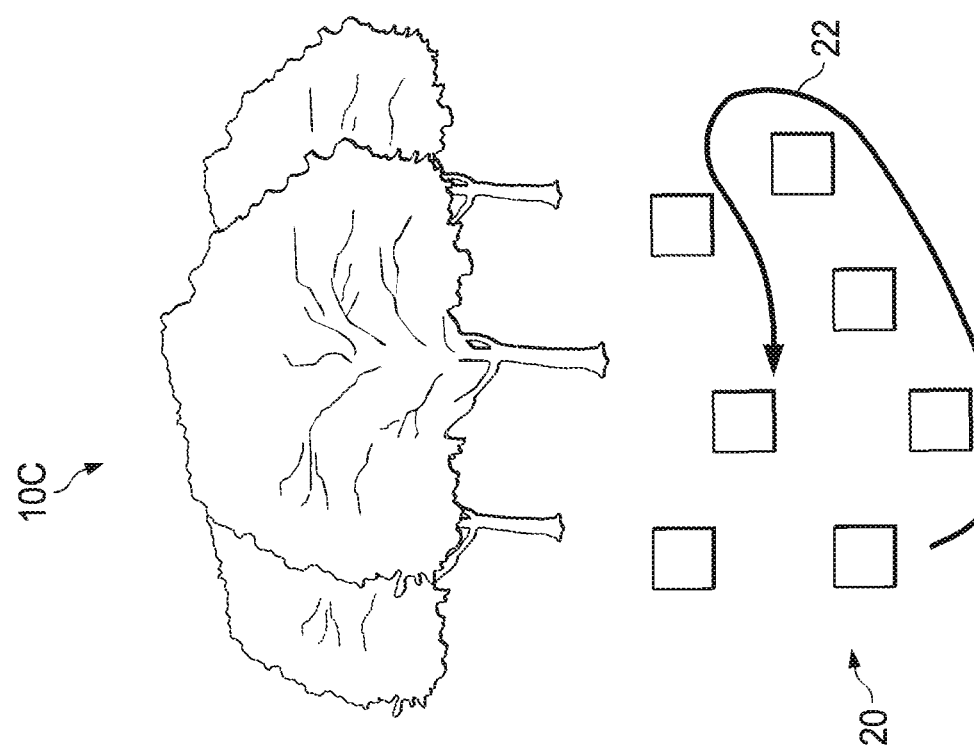
FIG. 2B shows an example of a method of recording a scene by moving a camera in a random path across a scene (a set of trees) while recording images of the scene in video mode.

Some examples of different motion paths will now be described. FIG. 1 shows an example of a recording of scene 101 (a group of trees) by capturing a series of images 12 while moving the camera along the horizontal motion path 14. While the recording is occurring, the device that contains the camera can record the location of the camera relative to the scene by recording the displacement or movement of the camera in at least the X and Y directions (with the horizontal direction being on the X axis and the vertical direction being on the Y axis); this recording of displacements can be performed for each image in the series of images and this recording is described further below. FIG. 2A shows an example of a recording of scene 10B (another group of trees) by capturing a series of images 16 while moving the camera in a circular path 18. FIG. 2B shows an example of a recording of scene 10C (another group of trees) by capturing a series of images 20 along a random motion path 22 (moving in both horizontal and vertical directions). FIG. 2C shows an example of a recording of a scene (not shown) by capturing a series of images 25 in a serpentine motion path 23. For each of these recordings, the device containing the camera can record the position of the camera at each image in the series of images (or at least a subset of those images), and this recording can begin with an initial assumed position of 0,0 (e.g., X=0, Y=0) for the first image, and each image thereafter is associated with the displacement (e.g., delta X=0.25 mm, delta y=0.0 mm) of the camera from its prior image to the current image in the series. For example, the first image has a position of X=0, Y=0 and then the next (2' image has a position of X=0.25, Y=0.0 (if the displacement from the first image to the next image was delta X=0.25 mm, delta y=0.0 mm). These recorded displacements can be referred to as motion path metadata that describes the position of an image in the series of images along the motion path so that it is later possible to select images based on their position on the motion path (e.g., first image along the path, or last image along the path, or an image about ⅓ of the way along the path, etc.). Further information about motion path metadata is provided below.

Figure 3:
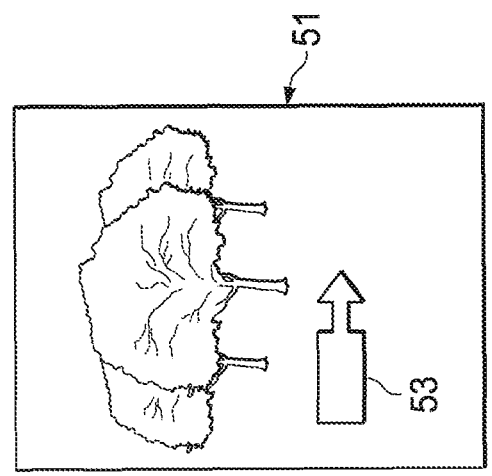
FIG. 3 shows an example of a user interface that displays a guide that helps a user record the scene by providing hints for one or more of: direction of movement and speed of movement.

During the recording of the scene, the camera or device containing the camera can display a guide to the user to show the user how to move the camera or device while recording the scene. FIG. 3 shows an example of a guide 53 that can be displayed on a display device 51 of the camera (or device containing the camera); the display device 51 may be, for example, the front facing display of a smart phone. The guide 53 can be displayed as a translucent overlay above the image that is displayed shortly after it is captured. The guide may show a representation of the scene as captured by the camera, along with a shaded area representing what portions of the scene have already been captured (and what remains to be captured) as well as an arrow indicating the direction to move the camera next. Additional text may instruct the user to increase or decrease the speed of motion or to better follow the desired capture path. This guide can be shown in many different forms, such as a line with an arrow that indicates the direction of desired movement, and the size of the line can increase over time, with the rate of increase indicating a desired speed of movement. Another user interface example of a guide can use a fixed size bar with a pointer on the bar that moves along the bar in the desired direction (with the desired speed). It is expected that users will tend to move faster at the beginning of a motion path and move slower near the end of the motion path, and such guides can help a user control both the direction of the actual path and the speed of the actual path. The embodiments described below can be used to cure deviations in both direction and speed with post processing operations which can be performed on either the recording device or the playback device.

In an embodiment, the camera may be provided with instructions to, during capture of a series of images, display the guides. The instructions may be provided to the camera, such as a processing unit and/or display unit of the camera, by a data processing system, potentially during the receipt of a series of images from the camera at the data processing system. The instructions may be generated at the data processing system and/or may cause the camera to display the guides.

Motion path metadata in one embodiment provides an estimate of the actual motion path of the camera, for example the displacement of each video frame or image from the last video frame or image. FIGS. 4A and 4B show the difference between the intended motion path 75 (in FIG. 4A) and an actual motion path 90 (in FIG. 4B) taken during a recording. The intended motion path 75 includes a series of image 76-87 that are evenly spaced along the intended motion path 75. Thus, the direction in the intended motion path 75 is perfectly horizontal with no deviations and the speed of motion along the path is even (no changes in speed over the period of time of the recording. In the actual motion path 90 (in FIG. 4B), the motion (or capture) path is not only horizontal, but contains vertical shifts or deviations as well; the actual motion path 90 includes images 89, 91-99. Additionally, the camera is not displaced by an even amount horizontally between each frame or image; there are several erratic jumps between images (e.g., from image 89 to the next image) and also several overlapping images, so the speed of the motion changes over the period of time of the recording. The motion path metadata for the recording shown in FIG. 4B will reveal both the deviations outside of the path (e.g., the vertical deviations) and the deviations in the displacements due to changing the speed of the motion during the recording.

The actual motion path can be estimated in a device using image processing to estimate the motion from the captured images, or a device may use other sensors such as accelerometers and gyroscopes to determine the displacements from image to image along the path. In one embodiment, the relative position of the user's face to the preview window is used to estimate the actual motion path. This motion path can be stored as displacement path metadata associated with the limited volumetric image. In one embodiment this metadata may be represented as a 2D (horizontal and vertical) displacement [deltax, deltay] between each frame [n] in units of millimeters (mm) up to a precision of ¾ of a mm, and represented as 12 bit unsigned values:

MotionPath[$n$]=CLAMP(0, 4095, floor([deltax, deltay]*4+0.5)+2048))

where c=clamp(a, b, x) denotes
c=a if x≤a, c=b if x≥b, or c=x otherwise.
This example is valid for displacements of +−0.25 mm to +−512 mm.

In another embodiment, the motion path metadata may be more simply represented as a total displacement between the first and last frame (e.g., total distance travelled by the camera during the recording of X mm), which is to be divided evenly by the number of frames to obtain the displacement offset for each frame. If sensors are used to capture the motion path metadata, then the recording device would normally produce the motion path metadata, but if image processing is used to derive the motion path metadata, then a playback device could generate the motion path metadata (and also perform the optional image processing described herein) after receiving the series of images. As described further below, the motion path metadata allows a playback device to select an image in the volumetric image based on the image's position on the motion path (e.g., first image along the path, or last image along the path, or an image about ⅓ of the way along the path, etc.); for example, if a desired viewpoint is one third of the way along the path and the path is 24 mm long (from beginning to end), then the playback device uses the motion path metadata to find the closest image at 8 mm from the beginning of the motion path.

Figure 5:
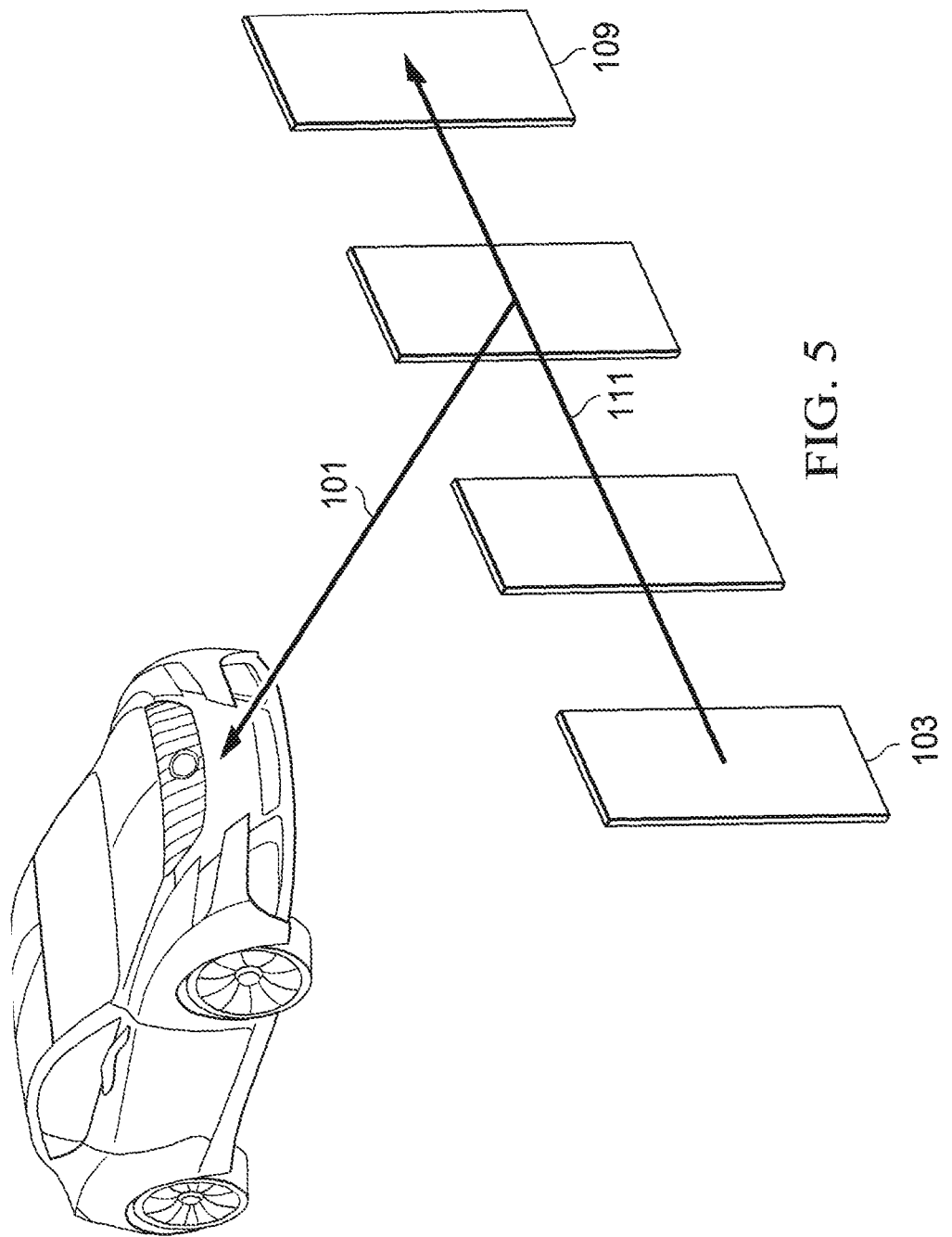
FIG. 5 shows an example of a measurement of a distance between an object in the scene being recorded and the camera; in another embodiment, the distance can be recorded for each image being recorded.

Another set of metadata that can be created and used is scene distance metadata. Scene distance metadata provides an estimate of the distance of the scene from the camera. FIG. 5 illustrates the metadata describing the distance 101 of the scene to the capture device that is recording a series of images (including images 103 and 109 along the motion path 111). In one embodiment, this distance may be a single value representing the distance from the camera to a single object of interest. This is typically a foreground object such as a person, or in the example shown in FIG. 5, a car. Other embodiments may store a depth map of the entire scene, either for a reference position (the central position of the motion path) or for each capture position of each image. The distance for an object of interest can be estimated for a single point by using the range finding capabilities of the camera (typically used for autofocus). Alternately, the depth may be estimated by comparing the image captured from multiple locations along with information about the displacement, or from two or more cameras with known displacement. Such techniques are known in the art and have been used for extracting depth maps from binocular 3D image pairs. In one embodiment, a SLAM (simultaneous location and mapping) algorithm can be used determine a camera's position within a scene. In one embodiment this metadata is represented as the reciprocal of the distance in meters represented using 12 bits unsigned values:

$$\text{SceneDistance} = \text{CLAMP}(0, 4095, \text{floor}(1/d*4096+0.5)),$$

where floor(x) provides the greatest integer less than or equal to x.

This example of metadata is valid between just over 1 m (4096/4095) distance to infinite distance (with the last distance before infinity being 8192 m). The distance information can be used when performing interpolations to create an image at a desired viewpoint when multiple images are selected as potential candidates of the desired viewpoint at the playback device.

Another set of metadata that can be created and used is dynamic range metadata. Dynamic range metadata can describe the luminance range (e.g., minimum luminance value, average luminance value, and maximum luminance value) of the content from each viewpoint (e.g., each image in the series of images in the volumetric image). Additional metadata can be collected or computed for each frame or image in the recording which describes the luminance range of the scene from that perspective. Thus as the camera moves from a very dark portion of a scene to a very bright portion, the dynamic range metadata can reflect the statistics of the content (e.g., minimum luminance value, average luminance value, and maximum luminance value for each image in the series of images) to guide downstream color volume mapping algorithms, such as algorithms used in Dolby Vision RDR processing. To ensure temporal stability as the user switches viewpoints, temporal filtering may be applied as discussed in U.S. Provisional Patent Application "Picture metadata for high dynamic range video," by R. Atkins, Ser. No. 63/066,663, filed on Aug. 17, 2020. This metadata can be in addition to the existing Dolby Vision metadata which would be common to all frames in the sequence. In one embodiment, the dynamic range metadata may be represented as a per-frame [n] offset to Dolby Vision L3 metadata (luminance offsets of the min, mid, and max, represented in PQ):

$$\text{ViewPointOffsets}[n] = \text{CLAMP}(0, 4095, \text{floor}([\text{PQOff-setMin/Mid/Max}]*4096+0.5)+2048)$$

This metadata can be valid in the range of −0.5 to 0.5 offsets in PQ luminance. At playback time, this metadata can be used to adjust image data values at pixels in the image based upon the dynamic range of a particular image at a desired viewpoint and the luminance range capabilities of the particular display device on the playback device.

Once the scene has been captured, optional image processing may be applied to improve the captured video, as described below. The goal of this processing can be to simplify the playback behavior, since by applying the processing a single time during image capture, or thereafter on systems other than playback devices, a greater range of playback devices may be enabled with minimal computation needed on the playback devices. If the image processing is not applied at image capture, but rather at image playback, it may be possible to obtain greater image fidelity in some cases (since the full quality captured signal can be stored and transmitted) but the playback device may be required to perform similar functions as described below. Applying the processing as described below at or after capture can also lead to improved compression efficiency, since there may be a higher correlation between adjacent frames along the camera motion path.

Figure 6A:
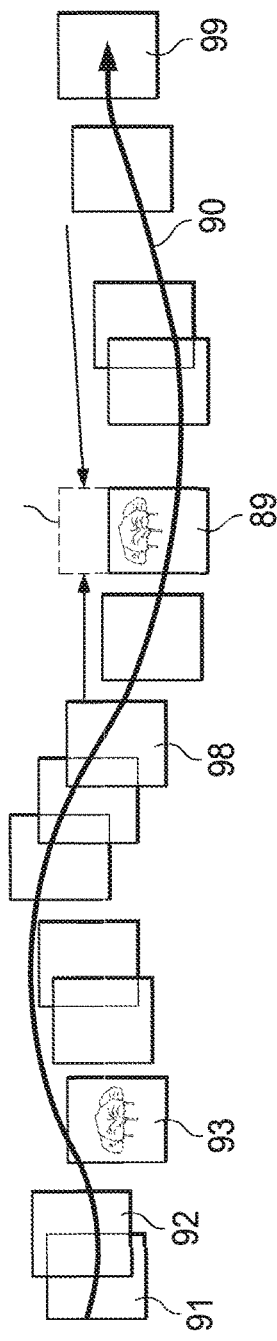
FIG. 6A shows another example an actual motion path (for an intended path that is a horizontal line); it also shows a possible interpolation of missing portions of an image (video frame)
Figure 6B:
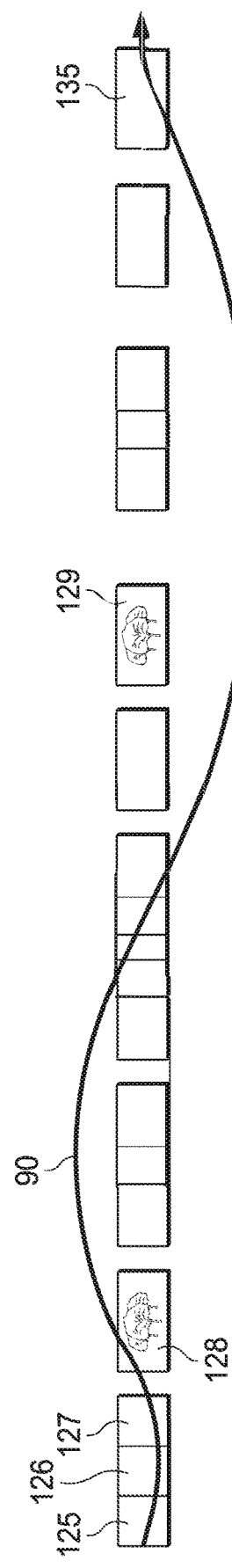
FIG. 6B shows an example of how the images in the series shown in FIG. 6A can be conformed to the intended horizontal path by cropping the images to remove the deviations from the horizontal path.

One optional image processing method may attempt to conform or align the images to an intended motion path (which may be selected by a user either prior to or after a recording session of a scene); this conforming or aligning can adjust the images to correct for deviations outside of the intended motion path. A system in one embodiment may ask a user to confirm or select an intended path (e.g., a horizontal path or circular path or vertical path, etc.) and then perform operations described below to conform or align the images or frames to the intended motion path. For example, if a horizontal-only motion path is desired, then any deviation in the vertical direction may be removed by cropping the individual video frames (as is commonly done when capturing panoramic photos). For example, FIG. 6A shows the actual motion path for a horizontal motion path 90 (containing images 89, 91-93, and 98), and FIG. 6B shows the corrected path (containing cropped images including images 125-129 and 135) after applying vertical alignment and cropping. The cropping can retain those portions of each image which are common across all of the images while cropping the rest of each of the images. This can be seen in FIG. 6B which shows how only the common portion of the tree in images 93 and 89 are retained in the cropped version in in images 128 and 129 in FIG. 6B. Instead of cropping portions of the image it may be preferable to interpolate missing portions of an image based on neighboring frames. This can be done using techniques known in the art for interpolating additional frames for frame rate interpolation, but used in this case to paint in large missing regions of an image. For example, the image 89 in FIG. 6A would have missing information in the top region of the frame (dotted line 115) that could be interpolated from nearby frames as illustrated. When such image processing has been applied, the capture path metadata should be updated accordingly to reflect the new corrected displacement of the images (for example, cropping may eliminate entire images and require that the displacement values along the path be adjusted to compensate for the deleted images). Although a vertical-only correction is illustrated, this technique can also apply to other capture paths such as a circular path. Rather than simply cropping the images, they could be "shifted" to align to the intended motion path. This is much like the next section where the images are conformed along the motion path. The shift could be as simple as a translation, but may be more sophisticated for devices that can support it, and include interpolation and inpainting using information present in neighboring images. This would be preferable to cropping but requires much more computation.

Figure 6C:
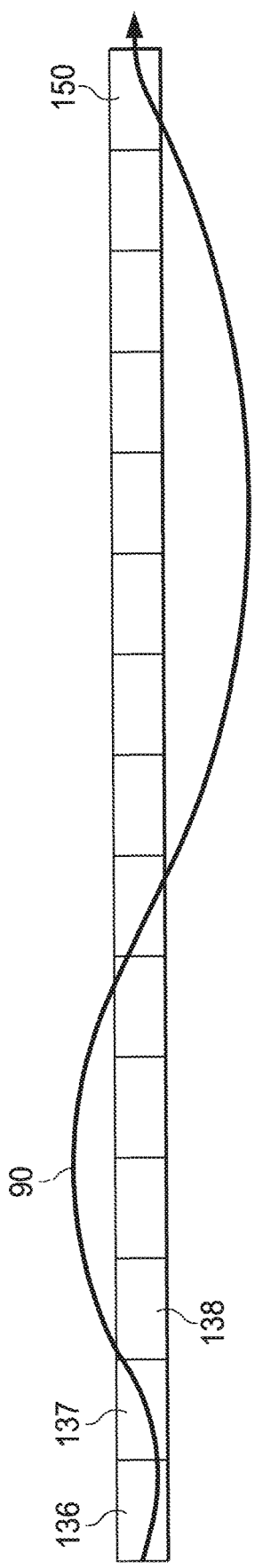
FIG. 6C shows an example of how images in the series shown in FIG. 6B can be further adapted to smooth displacements from image to image (e.g., by equalizing the frame to frame displacement distances).

Another optional image processing method may attempt to conform or align the images to correct for deviations along an intended motion path (which may be selected by a user either prior to or after a recording session of a scene); this conforming or aligning can adjust the images to correct for variations of the speed of movement during the recording along the intended motion path. For example, this optional image processing can align the video frames to equalize or smooth the displacement between each image along the motion path. For example, in a horizontal motion path, the movement speed may have been faster at first and then slowed down, thus causing larger displacement between images at first, and smaller displacement by the end, as illustrated in FIG. 6B. Video processing can be applied to equalize the displacement by interpolating additional images at the beginning, or by removing some images at the end, resulting in an even displacement between frames as shown in FIG. 6C. When such image processing has been applied, the motion path metadata should be updated accordingly to reflect the new corrected displacement values between the images.

Another optional image processing method may attempt to remove object motion in the scene (such as a person running through the scene). Some moving objects in the scene such as people, vehicles, even waves and clouds, may interfere with the intended experience of viewing the same scene from different viewpoints at playback. To improve the experience, the movement of objects in the scene can be removed using image processing techniques known in the art, and typically used for capturing panoramic images. This is sometimes known in the art as "ghost removal". See M. Uyttendaele et al., "Eliminating ghosting and exposure artifacts in image mosaics," Proceedings of the 2001 IEEE Computer Society Conference on Computer Vision and Pattern Recognition. CVPR 2001 Vol. 2. IEEE, 2001

Distribution of a Volumetric Image

Once a limited volumetric image has been captured and processed, it is ready for distribution. This can be done by using standard video encoding techniques to compress frames in order from the first image captured along the camera motion path during the recording to the last image along the motion path at the end of the recording. The correlation between images is probably very high, which a video encoding engine is able to exploit to produce very efficient compressed representation of the limited volumetric image.

It should be clear to those familiar with the art that other encoding techniques are also possible, including current efforts in multi-picture encoding; or encoding for augmented or virtual reality content. However, these techniques are not a requirement of embodiments in this disclosure, which describes techniques of delivering limited volumetric content even to devices using conventional video decoders. This allows a low-power and low-complexity decoding operation since such decoders are highly optimized for power consumption and performance.

In some embodiments, the GOP structure (group of pictures, referring to the selection of I, B, and P frames) of the encoding process may be made symmetrical, so that decoding speed can be optimized for both the forward and reverse directions:

1) In a particular embodiment, the encoding may only use I frames; without any inter-frame prediction at all.
2) In another embodiment the encoded limited volumetric image contains two I frames as the first and last frames of the sequence, with all others being P frames predicted only from the first and last.
3) In another particular embodiment, the frame sequence is encoded in both forward and reverse order and concatenated together, in order to further facilitate smooth playback in both forward and reverse direction for decoders that are optimized for playing in only a single direction.

The encoded video content, along with the metadata as described in the previous section, can be multiplexed together or assembled to form a single package containing a limited volumetric image. Additional metadata can be added to:

1) Label this type of video as a limited volumetric video (to differentiate it from other types of videos, so that a playback device can process it properly), for example using Dolby Vision L11 "content type" metadata, as presented in WIPO WO 2020/265409, "Video content type metadata for high dynamic range," by R. Atkins and P. J. A. Klittmark.
2) Include a representative frame as a thumbnail image or first frame of the video, which may not correspond to the first frame of the capture path; in order to aid with thumbnail views and image browsing.

Playback

A playback device that receives a volumetric image can detect or recognize that it is a volumetric image based on the presence of a volumetric label or tag. This recognition can cause the device to pass the volumetric image to a video decoder with playback paused (so that the recorded movie does not automatically play). The playback device can then determine a desired viewpoint of the volumetric image and then select or generate an image at the desired viewpoint.

The determination of the desired viewpoint by the playback device can depend on the capabilities and configuration of the playback device. In what may be called a preview mode, the playback device receives no user interaction to select a desired viewpoint; rather, the playback device automatically advances the viewpoint in a continuous and looping configuration. The content creator (of the volumetric image) may select a particular sequence of viewpoints (that may be different than the natural sequence through the motion path used during the recording), and that sequence may be used instead of the natural sequence from the beginning to the end of the motion path. The user is able to see the image from multiple different perspectives, but does not attempt to control the desired perspective. In one embodiment, no user controls may be provided in preview mode while in another embodiment, the user can stop or exit the preview mode and invoke user interface elements to select a desired viewpoint or invoke a tracking mode through the selection of a user interface element that invokes tracking mode. In what may be called a manual mode, the playback device displays one or more user interfaces that allow a user to select a desired viewpoint. In manual mode, a user interacts with some control to select the desired viewpoint. This could be in the form of dragging on a displayed image form the volumetric image using a finger or controlling a slider with a mouse or finger. The user has some form of control through one or more user interface elements over the perspective, but it requires manual and deliberate interaction by the user. In what may be called a tracking mode, a sensor or set of sensors on the playback device are used to estimate a user's position with respect to the screen displaying an image from the volumetric image. The sensor may be, for example, a front facing camera (e.g., sensor 355 in FIG. 8C) that captures images of the user's head to determine the user's position or gaze at the screen. A suitable camera may be a structured light or time-of-flight cameras, but conventional 2D cameras can also be used. The position of the face is extracted from the camera view using known techniques. As the user moves (in X, Y, and Z) the perspective is updated according to the user's position. With sufficient metadata and calibration this mode may provide a high-fidelity reproduction of the scene; by matching the viewpoint of the user to the correct viewpoint captured in the actual scene.

The selection or generation of an image at the desired viewpoint by the playback device can also depend on the capabilities and configuration of the playback device and also the range of the motion path of the content. In one embodiment, the playback device can perform the following operations.

a. First, the desired viewpoint (which may be referred to as the desired position in the video) is used to find the closest images (frame(s)) along the motion path. This can be done by comparing the desired viewpoint to the motion path metadata to find the closest match(es). In one embodiment the image is selected that has the nearest match between the motion path and the desired viewpoint. For example, if the desired viewpoint is half way along the motion path (in effect, the middle of the volumetric image) and the motion path is 24 mm long, then the image that is closest to 12 mm from the beginning of the motion path is selected. As described herein, the motion path metadata can include a position for each image; when displacements are stored in the metadata, the position can be computed from the sum of all prior displacements of the prior images/frames. In another embodiment, the nearest N frames are selected, with N between 2 and 6, and used to interpolate to create an image at an even closer position. The motion path metadata can be pre-processed to establish a 1D or 2D array of entries that is stored in memory of corresponding desired viewpoints and frame indice(s), so that this processing is only necessary to do a single time.
  b. Next, the selected images or frame(s) are decoded by a video decoder in the playback device. This can also be done in a pre-processing stage, and the result stored in memory to allow for faster and smoother access to the decoded pictures, depending on the capabilities of the playback device and desired performance.
  c. The decoded frame(s) can then be displayed or interpolated into a new viewpoint. If only a single frame is selected in step (a), then that image can be displayed directly. If multiple frames are selected by step (a), then these can be shown continually in sequence, or they can be further processed to interpolate to create an image at an additional viewpoint. Methods to perform such interpolation are known in the art for the purpose of interpolating frame rates or missing viewpoints. The distance of the observer can also be included in this interpolation as described in U.S. provisional patent application No. 63/121,372, "Processing of extended dimension light field images," by R. Atkins, filed on Dec. 4, 2020.
  d. Optionally, the decoded and/or interpolated frames can be adapted further according to the desired viewpoint metadata. For example, for a limited volumetric view with only horizontal motion path, there are no captured viewpoints corresponding to vertical displacements. However; in order to simulate some amount of vertical movement, the image can be adapted to shift it vertically. Likewise, the image can also be adapted to simulate an amount of zoom for closer or more distant viewing positions. The vertical shift and zoom can be combined into an affine transform that is applied to the image before or as it is displayed. In one embodiment, the transform can also be computed to include the difference in desired vs actual displacement of the nearest image along the motion path.
  e. Finally, the selected or interpolated image can optionally be processed using Dolby Color Volume Mapping (CVM) using the dynamic range metadata associated with the selected frame and the characteristics of the display panel of the playback device. For interpolated frames the metadata may also be an interpolated metadata. The mapped image is then displayed to the user. If pre-decoding the images in step (b), the CVM operation may be applied to the source frames, so that it can be only applied a single time instead of each time the viewpoint changes.

For binocular 3D displays, this process may be repeated for two adjacent views corresponding to the position of each eye. For autostereoscopic or multiscopic displays additional views may be rendered according to the capabilities of the display device, in order to provide parallax viewing for multiple observers and/or enable a smoother and more responsive playback experience.

Figure 7A:
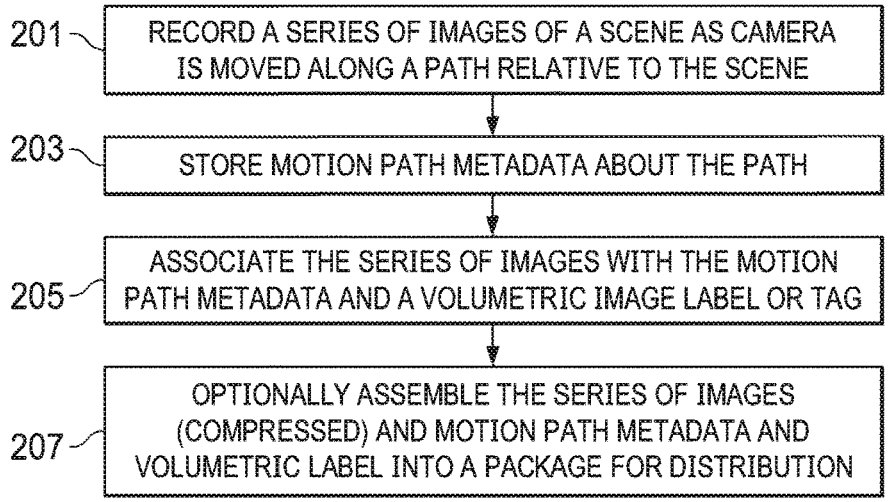
FIG. 7A shows an example of a method of recording a volumetric image.

Various embodiments will now be described while referring to several flowcharts in the figures. FIG. 7A shows a general example of a method for recording or creating a volumetric image according to one embodiment. This method can begin with a recording along a motion path in front of a scene, such as the 10A shown in FIG. 1. In operation 201, the camera can record a series of images (e.g., video frames when the camera is set in video recording mode) while the camera is being moved along the motion path relative to the scene. Then in operation 203, the camera (or the device containing the camera or coupled to the camera) can store motion path metadata (described above) about the path. This motion path metadata is then associated with the series of images in operation 205 so that the motion path metadata can later be used, at playback time on a playback device, to find an image or frame at a desired viewpoint. In addition, the series of images can be labelled or tagged with a metadata label (e.g., a volumetric image label) that indicates that the series of images collectively provide a volumetric image. Then in operation 207, the series of images can be compressed (e.g., using standard video compression methods for compressing a movie) and assembled with the motion path metadata and the volumetric label into a package for distribution. The method shown in FIG. 7A can be performed by one device (e.g., a smart phone) or several devices (e.g., a smartphone that records the scene and saves the motion path metadata and another device, such as a laptop computer, that performs operation 207).

The package for distribution, into which the series of images, motion path metadata and volumetric label metadata may be assembled, may be a data or file package for distribution. The package may be a single data file or a single file directory/folder.

Figure 7B:
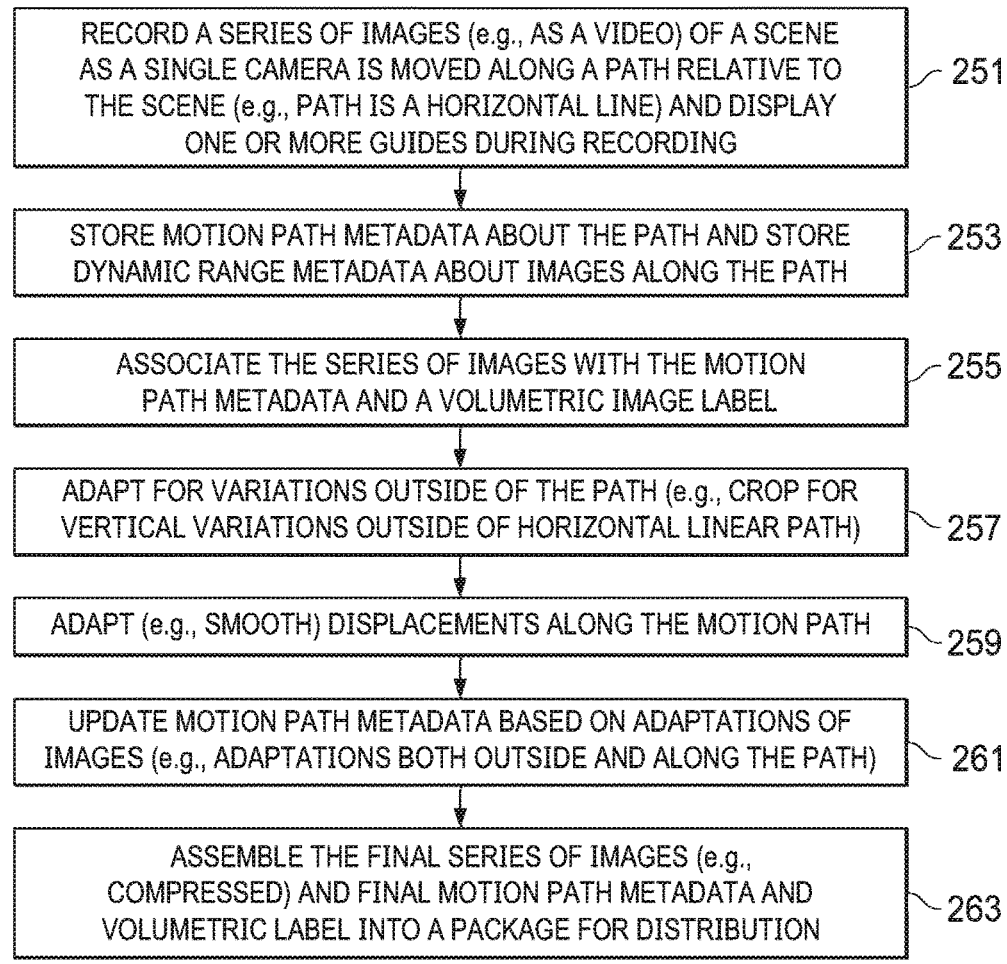
FIG. 7B is a flow chart that shows another example of a method of recording a volumetric image.

FIG. 7B shows a more detailed example of a method for recording or creating a volumetric image according to one embodiment. This method can begin with a recording along a motion path in front of a scene, such as the 10A shown in FIG. 1. In operation 251, a single camera can record a series of images (e.g., video frames when the camera is set in video recording mode) while the camera is being moved along the motion path (e.g., a horizontal line) relative to the scene; one or more guides can be displayed in operation 251 to the user who is moving the camera to help the user move the camera along the motion path while recording the scene. Then in operation 253, the camera (or the device containing the camera or coupled to the camera) can store motion path metadata (described above) about the path and also store dynamic range metadata about the images along the motion path. In operation 255, the recorded series of images can be associated with the stored motion path metadata and dynamic range metadata and a volumetric image label; operation 255 in one embodiment can occur near the end of the method in FIG. 7B (e.g., after operation 261). In operation 257, a data processing system can adapt the series of images to correct for deviations outside of the intended motion path; for example, as described above, the system can crop images and interpolate images to correct for vertical deviations outside of an intended horizontal motion path. In operation 259, a data processing system can adapt or smooth displacements between images along the motion path; for example, as described above, the system can add or remove images to smooth the displacements. In operation 261, a data processing system can update the motion path metadata based on adaptations made in operations 257 and 259; for example, if images are removed, moved or interpolated; this can change the position information for the final images in the video and thus the motion path metadata should be updated so playback devices have the correct metadata after these adaptations. Then in operation 263, a data processing system can compress the final series of images and assemble the final series of images with the final motion path metadata and volumetric label into a package for distribution (such as distribution through one or more networks such as the Internet). The method shown in FIG. 7B can be performed by one device (e.g., a smart phone) or several devices (e.g., a smartphone that records the scene and saves the motion path metadata and another device, such as a laptop computer, that performs operations 255; 257, 259; 261 and 263).

Figure 8A:
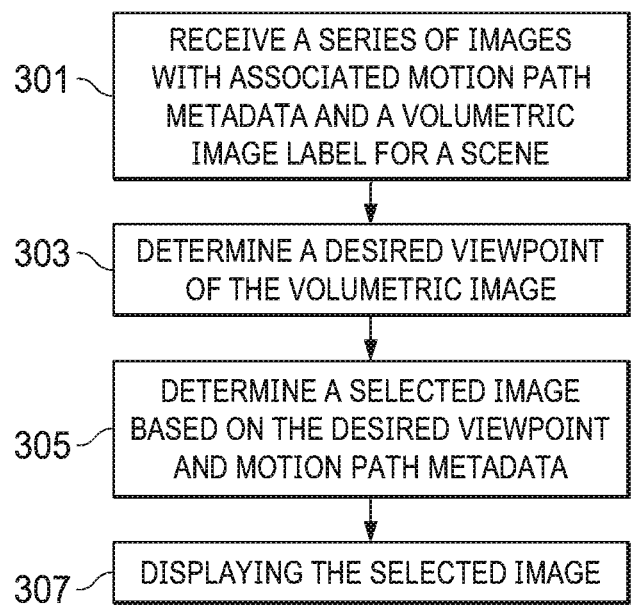
FIG. 8A shows an example of a method for displaying or playing back one or more images in a volumetric image.
Figure 8C:
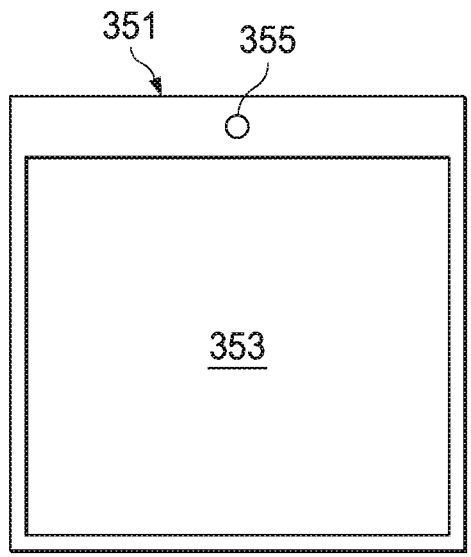
FIG. 8C shows an example of a playback device (e.g., a smart phone) that includes a display device and a front facing camera above the display device.
Figure 8D:
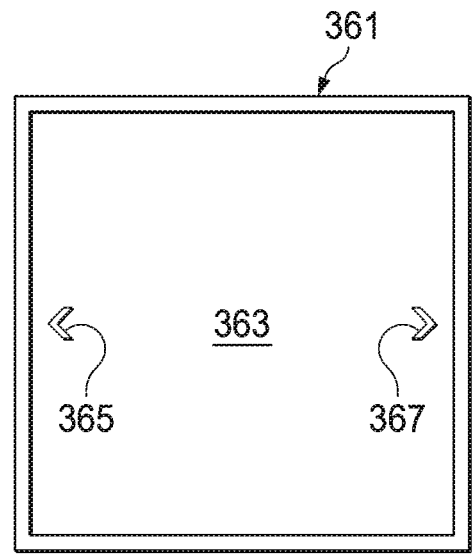
FIG. 8D illustrates an example of user interface (UI) for allowing a user to select a particular viewpoint on the volumetric image.
Figure 8B:
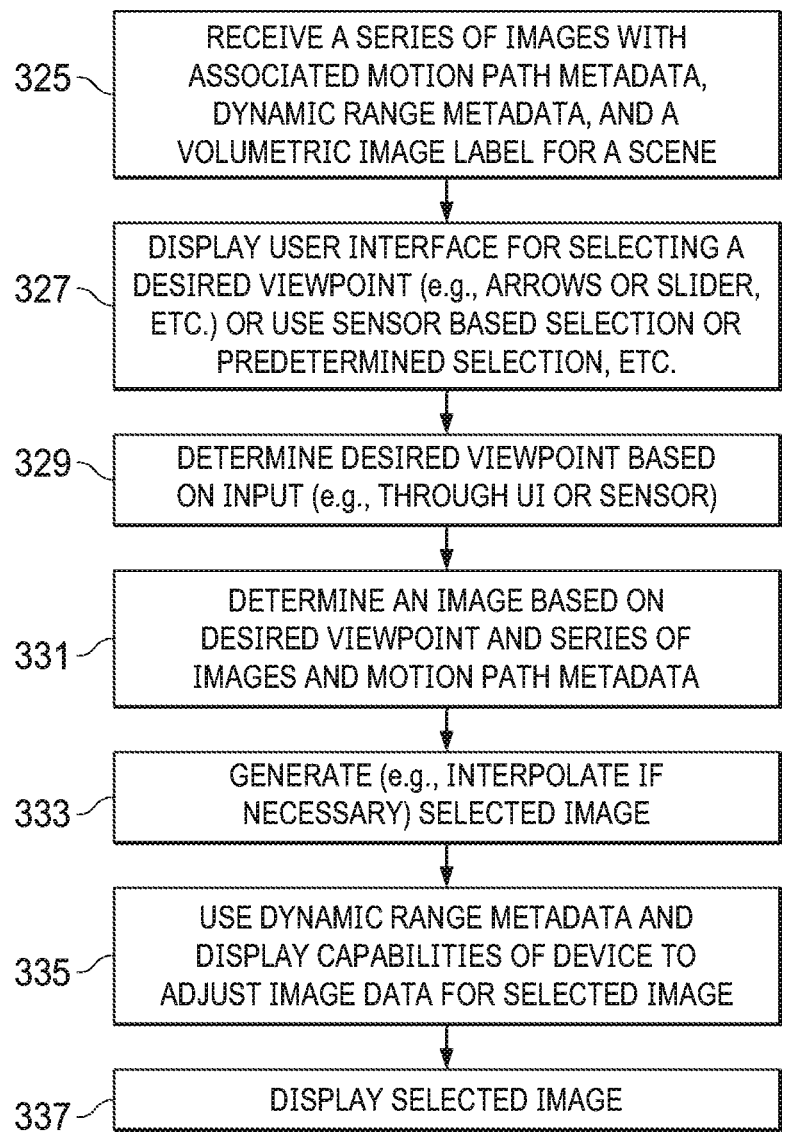
FIG. 8B shows another example of a method for displaying or playing back one or more images in a volumetric image.

Methods for displaying volumetric images are shown in FIGS. 8A and 8B. FIG. 8A shows a general example of a method for displaying one or more images from a volumetric image. In operation 301, a playback device receives a volumetric image; this receipt can be through a distribution channel (e.g., the Internet) or can be from a local storage on the playback device if the playback device was also the recording device that created the volumetric image. In operation 303, the playback device determines a desired viewpoint of the volumetric image (e.g., the user selects the viewpoint through use of a user interface element in FIG. 8D or the device determines the viewpoint through a sensor on the device such as the sensor 355 in FIG. 8C). Then in operation 305, the playback device determines a selected image based on the desired viewpoint and the motion path metadata for the volumetric image. Then in operation 307; the playback device displays the selected image.

FIG. 8B shows a more detailed method for displaying one or more images from a volumetric image. In operation 325, a playback device receives a volumetric image; this receipt can be through a distribution channel (e.g., the Internet) or can be from a local storage on the playback device if the playback device was also the recording device that created the volumetric image. In operation 327, the playback device may display a user interface for selecting a desired viewpoint; this user interface may be a slider or arrows displayed over an image in the volumetric image. FIG. 8D shows an example of arrows 365 and 367 on display 363 of playback device 361 that can be selected by a user; the arrow 365 can be selected to move to viewpoints to the left (which may be closer to the beginning of the motion path) and arrow 367 can be selected to move to viewpoints to the right (which may be closer to the end of the motion path). The display 363 can display one of the images from the volumetric image while receiving a user selection of one of the arrows 365 and 367. In another embodiment, the user interface may be a touchscreen that can receive user swipes or other gestures that indicate a selection of a desired viewpoint. In another embodiment, a sensor on the playback device can detect a user's head and the position of the head or gaze of the eyes to determine the desired viewpoint; FIG. 8C shows an example of a device 351 that includes a front facing camera 355 above the display 353. In one embodiment, the playback device may include multiple ways of allowing the user to select a desired viewpoint (e.g.; displayed arrows and the sensor), In operation 329, the playback device determines the desired viewpoint based on an input that is received (such as a user input or an input to the method from a sensor such as the front facing camera 355). Then in operation 331, the playback device determines which image to display based on the desired viewpoint from operation 329, the images available in the series of images, and the motion path metadata. This determination of the image has been described above. In some cases, it may be necessary or desirable to interpolate to create a new image from adjacent images in order to provide a good match to the desired viewpoint, and this can be done in operation 333 (using the techniques described above). Then in operation 335, the playback device can use the dynamic range metadata to adjust image data from the selected image in order to match the display capabilities of the display device used on the playback device to display the selected image. Lastly, in operation 337 the selected image from the volumetric image is displayed on the display device of the playback device.

Figure 9:
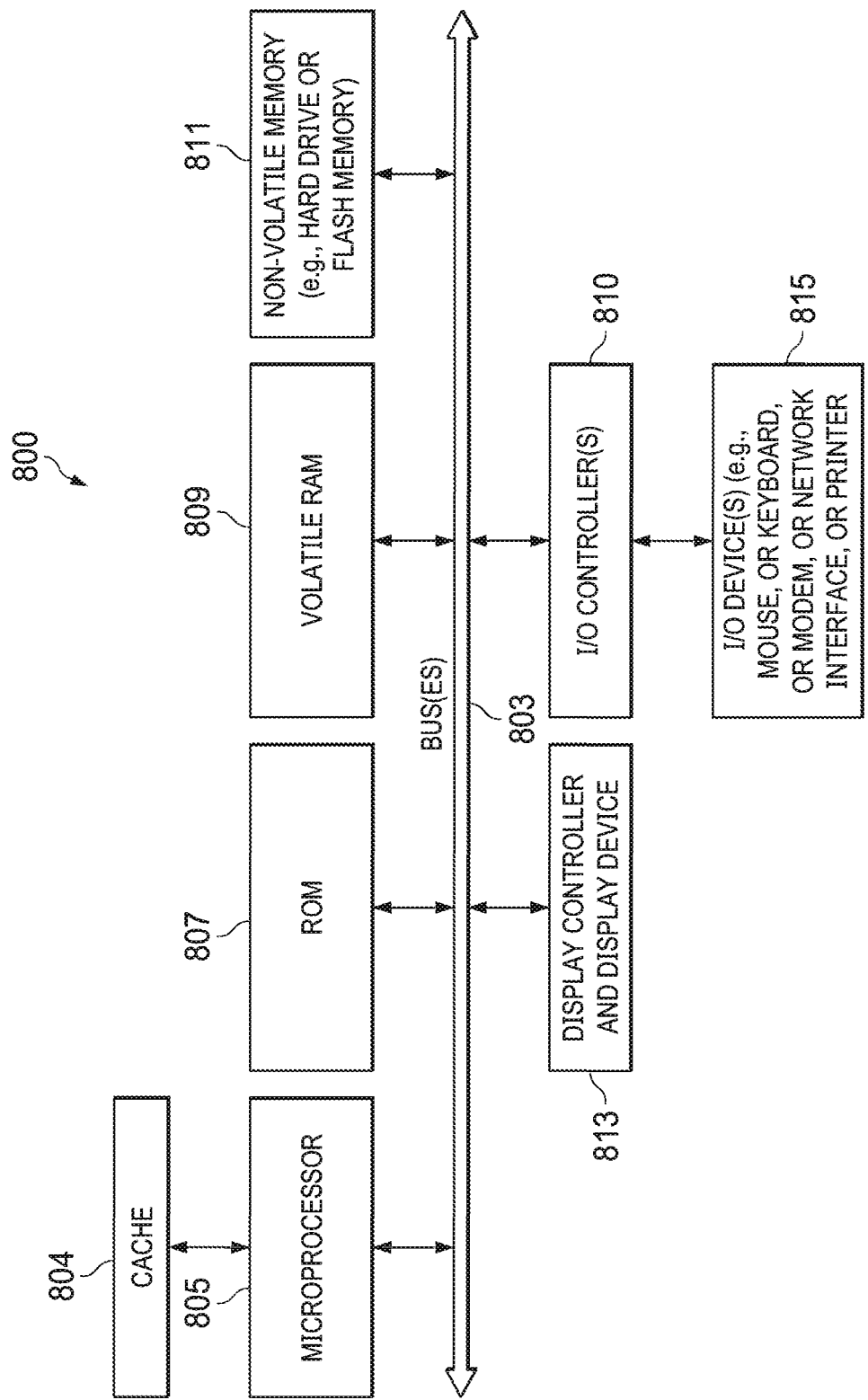
FIG. 9 is a block diagram that shows an example of a data processing system that can be used to implement one or more embodiments described herein.

FIG. 9 shows one example of a data processing system 800, which may be used with one or more embodiments described herein. For example, the system 800 may be used to perform any of the methods described herein, such as the methods shown in FIGS. 7A, 7B, 8A and 8B. The data processing system may also create volumetric images with associated metadata for consumption by playback systems, and the data processing system can be a playback system; moreover, the data processing system in FIG. 9 can be a system that is used to perform creation operations after a recording by a camera. Note that while FIG. 9 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure. In one embodiment, the data processing system can be a smart phone or other mobile devices. In one embodiment, the data processing system shown in FIG. 9 may include a camera that is one of the peripheral devices (e.g., 815) so that the data processing system can record the series of images and also collect motion path metadata while the series of images are captured; the motion path metadata can be obtained from sensors known in the art (e.g., accelerometers), and these sensors can also be peripheral devices in the data processing system. Such a data processing system can also associate the motion path metadata with the series of images and optionally also create a distributable package that contains the series of images, the motion path metadata and a volumetric image label. In another embodiment, the data processing system in FIG. 9 may be coupled to a camera to receive the series of images (and the sensor data about displacements or generate the sensor data); and then the data processing system creates the association between the motion path metadata and the series of images.

As shown in FIG. 9, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers, one or more cameras, and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 9 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may, comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar tell Is are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

EXEMPLARY EMBODIMENTS

The following text presents numbered embodiments in claim like format, and it will be understood that these embodiments may be presented as claims in one or more future filings, such as one or more continuation or divisional applications.

Although separate embodiments are described in detail below, however, it is appreciated that these embodiments may be combined or modified, in part or in whole. Moreover, each of these embodiments may also be expressed as methods or data processing systems instead of machine readable media.

Embodiment 1, A non-transitory machine readable medium storing executable program instructions which when executed by a data processing system, cause the data processing system to perform a method, the method comprising:
  recording, through a single camera, a series of images of a scene as the single camera is moved along a path relative to the scene;
  storing first motion path metadata about the path;
  associating the series of images with the first motion path metadata; and
  associating a metadata label with the series of images, the metadata label indicating that the recorded series of images represent a volumetric image of the scene.

Embodiment 2. The non-transitory machine readable medium as in embodiment 1, wherein the recording comprises a continuous capturing and storing of images, over a period of time, and the capturing is performed at a predetermined frame rate used for displaying video or at a rate based upon movement of the camera along the path.

Embodiment 3. The non-transitory machine readable medium as in embodiment 1 or 2, wherein a volumetric image comprises a set of images of the scene from different camera positions or viewpoints, and wherein the series of images, the associated first motion path metadata and the metadata label are assembled into a package, and wherein the series of images are compressed in the package.

Embodiment 4. The non-transitory machine readable medium as in any of embodiments 1-3, wherein the method further comprises:
  conforming the series of images to a desired motion path; and
  updating the first motion path metadata based on the conformed series of images.

Embodiment 5. The non-transitory machine readable medium as in embodiment 4, wherein the conforming vertically crops at least one or more images in the series of images and wherein the updating of the first motion path metadata updates the first motion path metadata based on changes, as a result of the vertical cropping, to the series of images.

Embodiment 6. The non-transitory machine readable medium as in embodiment 5, wherein the desired motion path is along a horizontal line.

Embodiment 7. The non-transitory machine readable medium as in any of embodiments 1-6, wherein the method further comprises:
  adjusting one or more positions of one or more images in the series of images to smooth one or more displacements along the desired motion path from image to image in the series of images.

Embodiment 8. The non-transitory machine readable medium as in any of embodiments 1-7, wherein the method further comprises:
  displaying one or more guides during the recording to guide a user, who moves the single camera, along the desired motion path.

Embodiment 9, The non-transitory machine readable medium as in any of embodiments 1-8, wherein the first motion path metadata indicates displacement, along the path, from one image to the next image in the series of images, and wherein optionally the recording, at playback time; supports (1) display of a single image at the desired viewpoint and (2) display of the series of images as a movie.

Embodiment 10. The non-transitory machine readable medium as in embodiments 1-9, wherein the method further comprises:
  storing distance metadata that provides an estimate of a distance between one or more objects in the scene and the single camera;
  storing dynamic range metadata that indicates a dynamic range in each image in a set of images in the series of images; the dynamic range for each image indicating a luminance range.

Embodiment 11. A non-transitory machine readable medium storing executable program instructions which when executed by a data processing system, cause the data processing system to perform a method, the method comprising:
  receiving a series of images with associated motion path metadata and a volumetric metadata label indicating the series of images represent a volumetric image of a scene;
  determining a desired viewpoint of the volumetric image;
  determining from the desired viewpoint a selected image based on the series of images;
  displaying the selected image.

Embodiment 12. The non-transitory machine readable medium as in embodiment 11, wherein determining the selected image is based upon a comparison of the desired viewpoint to the motion path metadata.

Embodiment 13. The non-transitory machine readable medium as in embodiment 11 or 12, wherein the series of images were recorded during a continuous capturing and storing of images in a single camera, over a period of time along a path of motion of the single camera, and the capturing was performed at a predetermined frame rate used for displaying video.

Embodiment 14. The non-transitory machine readable medium as in any of embodiments 11-13, wherein the volumetric image comprises a set of images of the scene from different camera positions or viewpoints, and wherein the series of images, the associated motion path metadata and the volumetric metadata label are received as a package, and wherein the series of images are compressed in the package.

Embodiment 15, The non-transitory machine readable medium as in any of embodiments 11-14, wherein the motion path metadata indicates displacement, along a path used during recording of the series of images, from one image to the next image in the series of images, and the motion path metadata is used at playback time to select for display the desired viewpoint on the scene, and wherein the recording, at playback time, supports (1) display of a single image at the desired viewpoint and (2) display of the series of images as a movie.

Embodiment 16. The non-transitory machine readable medium as in any of embodiments 11-15, wherein the desired viewpoint is determined from one of (1) manual user selection from a user interface or (2) sensor based tracking of a user's face or head or (3) a predetermined set of one or more viewpoints provided by a content creator.

Embodiment 17. The non-transitory machine readable medium as in embodiment 16, wherein the sensor based tracking automatically determines the desired viewpoint from a location, detected by the sensor, of a viewer's head.

Embodiment 18. The non-transitory machine readable medium as in any of embodiments 11-17, wherein method further comprises: adapting the selected image by zooming the selected image or vertically shifting the image through an affine transformation.

Embodiment 19. The non-transitory machine readable medium as in any of embodiments 11-18, wherein the method further comprises: receiving dynamic range metadata that indicates a dynamic range in each image in a set of images in the series of images, the dynamic range for each image indicating a luminance range; and mapping the selected image, based on its dynamic range metadata, to a target display's dynamic range capabilities.

Embodiment 20. The non-transitory machine readable medium as in any of embodiments 11-19, wherein the selected image is interpolated from a set of images in the series of images, the set of images representing a match between the desired viewpoint and the motion path metadata.

Embodiment 21, The non-transitory machine readable medium as in any of embodiments 1-20, wherein a time when each image in the series of images is captured is based on motion along the path, the motion detected by a device that contains the single camera.

Embodiment 22, The non-transitory machine readable medium as in embodiment 21, wherein the time when each image in the series of images is captured is not predetermined but is based on displacement data as the device is moved along the path.

Embodiment 23, The non-transitory machine readable medium as in embodiment 22, wherein the time when each image in the series of images is selected to conform a spacing of the images along the path.

Embodiment 24. An apparatus with one or more processors performing a method recited in any one of embodiments 1-23.

Embodiment 25. A method as recited in any one of embodiments 1-23.

Embodiment 26. An apparatus comprising: a camera to capture a series of images of a scene as the apparatus is moved along a path relative to the scene; a memory coupled to the camera to store the captured series of images; and a set of one or more sensors to generate motion path metadata indicating displacement, along the path, from one image to the next image in the series of images.

Embodiment 27. The apparatus as in embodiment 26, wherein the apparatus is coupled to a processing system and the apparatus provides the captured series of images and the motion path metadata to the processing system.

Embodiment 28. The apparatus as in embodiment 27, wherein the processing system performs a method recited in any one of embodiments 1-23.

Embodiment 29. A method performed by a data processing system, the method comprising: receiving, from a single camera, a series of images of a scene, the series of images captured as the single camera is moved along a path relative to the scene;

storing first motion path metadata about the path;

associating the series of images with the first motion path metadata; and associating a metadata label with the series of images, the metadata label indicating that the series of images represent a volumetric image of the scene.

Embodiment 30. The method as in embodiment 29 wherein the series of images are captured by a continuous capturing and storing of images; over a period of time, and the capturing is performed at a predetermined frame rate used for displaying video or at a rate based upon movement of the camera along the path, and wherein a volumetric image comprises a set of images of the scene from different camera positions or viewpoints; and wherein the series of images, the associated first motion path metadata and the metadata label are assembled into a package, and wherein the series of images are compressed in the package.

Embodiment 31, The method as in embodiment 29 or 30, wherein the method further comprises: conforming the series of images to a desired motion path; and updating the first motion path metadata based on the conformed series of images.

Embodiment 32. The method as in embodiment 31, wherein the conforming vertically crops at least one or more images in the series of images and wherein the updating of the first motion path metadata updates the first motion path metadata based on changes, as a result of the vertical cropping, to the series of images.

Embodiment 33. The method as in any of embodiments 29-32, wherein the method further comprises: adjusting one or more positions of one or more images in the series of images to smooth one or more displacements along the desired motion path from image to image in the series of images.

Embodiment 34. The method as in any of embodiments 29-33, wherein the method further comprises: displaying one or more guides during the recording to guide a user, who moves the single camera, along the desired motion path.

Embodiment 35. The method as in any of embodiments 29-34, wherein the first motion path metadata indicates displacement, along the path, from one image to the next image in the series of images.

Embodiment 36. The method as in any of embodiments 29-34, wherein the method further comprises one or both of the following operations: storing distance metadata that provides an estimate of a distance between one or more objects in the scene and the single camera; and/or storing dynamic range metadata that indicates a dynamic range in each image in a set of images in the series of images, the dynamic range for each image indicating a luminance range.

Various aspects of the present invention may be appreciated from the following enumerated example embodiments (EEEs):

EEE1. A non-transitory machine readable medium storing executable program instructions which when executed by a data processing system, cause the data processing system to perform a method, the method comprising:
recording, through a single camera, a series of images of a scene as the single camera is moved along a path relative to the scene;
storing first motion path metadata about the path;
associating the series of images with the first motion path metadata; and
associating a metadata label with the series of images, the metadata label indicating that the recorded series of images represent a volumetric image of the scene.

EEE2. The non-transitory machine readable medium as in EEE 1, wherein the recording comprises a continuous capturing and storing of images, over a period of time, and the capturing is performed at a predetermined frame rate used for displaying video or at a rate based upon movement of the camera along the path.

EEE3. The non-transitory machine readable medium as in EEE 1 or EEE 2, wherein a volumetric image comprises a set of images of the scene from different camera positions or viewpoints, and wherein the series of images, the associated first motion path metadata and the metadata label are assembled into a package, and wherein the series of images are compressed in the package.

EEE4 The non-transitory machine readable medium as in any of EEEs 1-3, wherein the method further comprises:
conforming the series of images to a desired motion path; and
updating the first motion path metadata based on the conformed series of images.

EEE5. The non-transitory machine readable medium as in EEE 4, wherein the conforming vertically crops at least one or more images in the series of images and wherein the updating of the first motion path metadata updates the first motion path metadata based on changes, as a result of the vertical cropping, to the series of images.

EEE6. The non-transitory machine readable medium as in EEE 5, wherein the desired motion path is along a horizontal line.

EEE7. The non-transitory machine readable medium as in any of EEEs 1-6, wherein the method further comprises:
adjusting one or more positions of one or more images in the series of images to smooth one or more displacements along the desired motion path from image to image in the series of images.

EEE8. The non-transitory machine readable medium as in any of EEEs 1-7, wherein the method further comprises:
displaying one or more guides during the recording to guide a user, who moves the single camera, along the desired motion path.

EEE9. The non-transitory machine readable medium as in any of EEEs 1-8, wherein the first motion path metadata indicates displacement, along the path, from one image to the next image in the series of images.

EEE10. The non-transitory machine readable medium as in any of EEEs 1-9, wherein the method further comprises one or both of the following operations:
storing distance metadata that provides an estimate of a distance between one or more objects in the scene and the single camera;
storing dynamic range metadata that indicates a dynamic range in each image in a set of images in the series of images, the dynamic range for each image indicating a luminance range.

EEE11. A non-transitory machine readable medium storing executable program instructions which when executed by a data processing system, cause the data processing system to perform a method, the method comprising:
receiving a series of images with associated motion path metadata and a volumetric metadata label indicating the series of images represent a volumetric image of a scene;
determining a desired viewpoint of the volumetric image;
determining from the desired viewpoint a selected image based on the series of images;
displaying the selected image.

EEE12. The non-transitory machine readable medium as in EEE 11, wherein determining the selected image is based upon a comparison of the desired viewpoint to the motion path metadata.

EEE13. The non-transitory machine readable medium as in EEE 11 or EEE 12, wherein the series of images were recorded during a continuous capturing and storing of images in a single camera, over a period of time along a path of motion of the single camera, and the capturing was performed at a predetermined frame rate used for displaying video.

EEE14. The non-transitory machine readable medium as in any of EEEs 11-13, wherein the volumetric image comprises a set of images of the scene from different camera positions or viewpoints, and wherein the series of images, the associated motion path metadata and the volumetric metadata label are received as a package, and wherein the series of images are compressed in the package.

EEE15. The non-transitory machine readable medium as in any of EEEs 11-14, wherein the motion path metadata indicates displacement, along a path used during recording of the series of images, from one image to the next image in the series of images, and the motion path metadata is used at playback time to select for display the desired viewpoint on the scene, and wherein the recording, at playback time, supports (1) display of a single image at the desired viewpoint and (2) display of the series of images as a movie.

EEE16. The non-transitory machine readable medium as in any of EEEs 11-15, wherein the desired viewpoint is determined from one of (1) manual user selection from a user interface or (2) sensor based tracking of a user's face or head or (3) a predetermined set of one or more viewpoints provided by a content creator.

EEE17. The non-transitory machine readable medium as in EEE 16, wherein the sensor based tracking automatically determines the desired viewpoint from a location, detected by the sensor, of a viewer's head.

EEE18. The non-transitory machine readable medium as in any of EEEs 11-17, wherein method further comprises:
adapting the selected image by zooming the selected image or vertically shifting the image through an affine transformation.

EEE19. The non-transitory machine readable medium as in any of EEEs 11-18, wherein the method further comprises:
receiving dynamic range metadata that indicates a dynamic range in each image in a set of images in the series of images, the dynamic range for each image indicating a luminance range; and mapping the selected image, based on its dynamic range metadata, to a target display's dynamic range capabilities.

EEE20. The non-transitory machine readable medium as in any of EEEs 11-19, wherein the selected image is interpolated from a set of images in the series of images, the set of images representing a match between the desired viewpoint and the motion path metadata.

EEE 21. A data processing system that performs a method as in any one of EEEs 1-20.

EEE 22. A non-transitory machine readable medium storing executable program instructions which when executed by a data processing system, cause the data processing system to perform a method as in any one of EEEs 1-20.

The invention claimed is:

1. A method performed by a data processing system, the method comprising:
   receiving a series of images with associated motion path metadata and a volumetric metadata label indicating the series of images represent a volumetric image of a scene;
   determining a desired viewpoint of the volumetric image;
   determining from the desired viewpoint a selected image based on the series of images and upon a comparison of the desired viewpoint to the motion path metadata;
   displaying the selected image.

2. The method as in claim 1, wherein a volumetric image comprises a set of images of the scene from different camera positions or viewpoints.

3. The method as in claim 1, wherein the series of images is a series of images captured by a single camera as the camera moved along a path, and wherein the series of images were captured at a rate based upon movement of the camera along the path.

4. The method as in claim 1, wherein the series of images is a series of images captured by a single camera as the camera moved along a path, and wherein the series of images were captured at a predetermined rate used for displaying video.

5. The method as in claim 1, wherein the series of images were recorded during a continuous capturing and storing of images in a single camera, over a period of time along a path of motion of the single camera.

6. The method as in claim 1, wherein the series of images, the associated motion path metadata and the volumetric metadata label are received as a package, and wherein the series of images are compressed in the package.

7. The method as in claim 1, wherein the motion path metadata indicates displacement, along a path used during recording of the series of images, from one image to the next image in the series of images, and the motion path metadata is used at playback time to select for display the desired viewpoint on the scene, and wherein the recording, at playback time, supports (1) display of a single image at the desired viewpoint and (2) display of the series of images as a movie.

8. The method as in claim 1, wherein the desired viewpoint is determined from one of (1) manual user selection from a user interface or (2) sensor based tracking of a user's face or head or (3) a predetermined set of one or more viewpoints provided by a content creator.

9. The method as in claim 8, wherein the sensor based tracking automatically determines the desired viewpoint from a location, detected by the sensor, of a viewer's head.

10. A non-transitory machine readable medium storing executable program instructions which when executed by a data processing system, cause the data processing system to perform a method comprising:
    receive a series of images with associated motion path metadata and a volumetric metadata label indicating the series of images represent a volumetric image of a scene;
    determine a desired viewpoint of the volumetric image;
    determine from the desired viewpoint a selected image based on the series of images and upon a comparison of the desired viewpoint to the motion path metadata;
    display the selected image.

11. The machine-readable storage medium of claim 10, wherein a volumetric image comprises a set of images of the scene from different camera positions or viewpoints.

12. The machine-readable storage medium of claim 10, wherein determining the selected image is based upon a comparison of the desired viewpoint to the motion path metadata.

13. The machine-readable storage medium of claim 10, wherein the series of images is a series of images captured by a single camera as the camera moved along a path, and wherein the series of images were captured at a rate based upon movement of the camera along the path.

14. The machine-readable storage medium of claim 10, wherein the series of images is a series of images captured by a single camera as the camera moved along a path, and wherein the series of images were captured at a predetermined rate used for displaying video.

15. The machine-readable storage medium of claim 10, wherein the series of images were recorded during a continuous capturing and storing of images in a single camera, over a period of time along a path of motion of the single camera.

16. The machine-readable storage medium of claim 10, wherein the series of images, the associated motion path metadata and the volumetric metadata label are received as a package, and wherein the series of images are compressed in the package.

17. The machine-readable storage medium of claim 10, wherein the motion path metadata indicates displacement, along a path used during recording of the series of images, from one image to the next image in the series of images, and the motion path metadata is used at playback time to select for display the desired viewpoint on the scene, and wherein the recording, at playback time, supports (1) display of a single image at the desired viewpoint and (2) display of the series of images as a movie.

18. The machine-readable storage medium of claim 10, wherein the desired viewpoint is determined from one of (1) manual user selection from a user interface or (2) sensor based tracking of a user's face or head or (3) a predetermined set of one or more viewpoints provided by a content creator.

19. The machine-readable storage medium of claim 18, wherein the sensor based track automatically determines the desired viewpoint from a location, detected by the sensor, of a viewer's head.

* * * * *